US012741719B2

(12) United States Patent
Olsen et al.

(10) Patent No.: US 12,741,719 B2
(45) Date of Patent: Sep. 22, 2026

(54) LOCK SYSTEM FOR TRANSPORT CONTAINERS AND METHOD OF ASSEMBLY THEREOF

(71) Applicant: Halliburton Energy Services, Inc., Houston, TX (US)

(72) Inventors: Vidar Olsen, Tananger (NO); Per Ståle Grude, Tananger (NO)

(73) Assignee: Halliburton Energy Services, Inc., Houston, TX (US)

( * ) Notice: Subject to any disclaimer, the term of this patent is extended or adjusted under 35 U.S.C. 154(b) by 349 days.

(21) Appl. No.: 18/641,090

(22) Filed: Apr. 19, 2024

(65) Prior Publication Data

US 2025/0326465 A1 Oct. 23, 2025

(51) Int. Cl.

*B63B 25/00* (2006.01)
*B60P 7/08* (2006.01)
*B65G 1/04* (2006.01)

(52) U.S. Cl.

CPC .......... *B63B 25/004* (2013.01); *B60P 7/0892* (2013.01); *B65G 1/0464* (2013.01); *B65G 1/0478* (2013.01)

(58) Field of Classification Search

CPC ....... B63B 25/004; B60P 7/0892; B65G 1/10; B65G 1/0478; B65G 1/0464

See application file for complete search history.

(56) References Cited

U.S. PATENT DOCUMENTS

| | | | | |
|---|---|---|---|---|
| 4,715,308 | A | 12/1987 | Denison et al. | |
| 6,077,019 | A * | 6/2000 | Corcoran | B63B 25/004 414/143.2 |
| 11,028,580 | B2 * | 6/2021 | Burt | E04C 3/07 |
| 2017/0106948 | A1 | 4/2017 | Fitzpatrick et al. | |
| 2017/0138134 | A1 | 5/2017 | Walker et al. | |
| 2019/0383446 | A1 | 12/2019 | Tjorhom | |
| 2024/0297060 | A1 * | 9/2024 | Oh | B65G 1/0464 |

FOREIGN PATENT DOCUMENTS

| | | |
|---|---|---|
| CN | 214139890 | 9/2021 |
| JP | 11059566 | 3/1993 |
| KR | 2014001166 A | 1/2014 |

* cited by examiner

*Primary Examiner* — Daniel J Colilla
(74) *Attorney, Agent, or Firm* — Thomas Rooney; Parker Justiss, P.C.

(57) ABSTRACT

A lock system for holding transport containers, the system including one or more pairs of brackets, each bracket including frame guides, axle guides and gusset plates. The frame guides are coupled to a major surface of a bracket body of the bracket and have guide walls projecting perpendicularly from the major surface to form frame openings. The axle guides are coupled to and project perpendicularly from the major surface and each of the axle guides surround first thru-holes in the bracket body. The gusset plates couple one of the guide walls to the major surface and the gusset plates have one or more second thru holes therein. A method of assembling the system is also disclosed.

20 Claims, 8 Drawing Sheets

LOCK SYSTEM FOR TRANSPORT CONTAINERS AND METHOD OF ASSEMBLY THEREOF

TECHNICAL FIELD

This application is directed, in general, to safe container storage and transport, and, more specifically, to a lock system for holding storage containers, such as drilling cuttings transport containers, and methods of assembling thereof.

BACKGROUND

In the oil and gas industry, many tons of cargo are generated, such as cuttings and drill fluids from a drilled formation at a drilling site. These cargo cuttings and fluids need to be collected and stored in transport containers, and, the containers shipped away from the drilling site, which may be a remote location on land or sea. It is desirable to safely store and secure such transport containers in a cost-effective and efficient manner in shipping vessels. Often the transport containers are welded and/or bolted to a shipping vessel to secure the containers for this type of filling and transport.

BRIEF DESCRIPTION

Figure 1A:
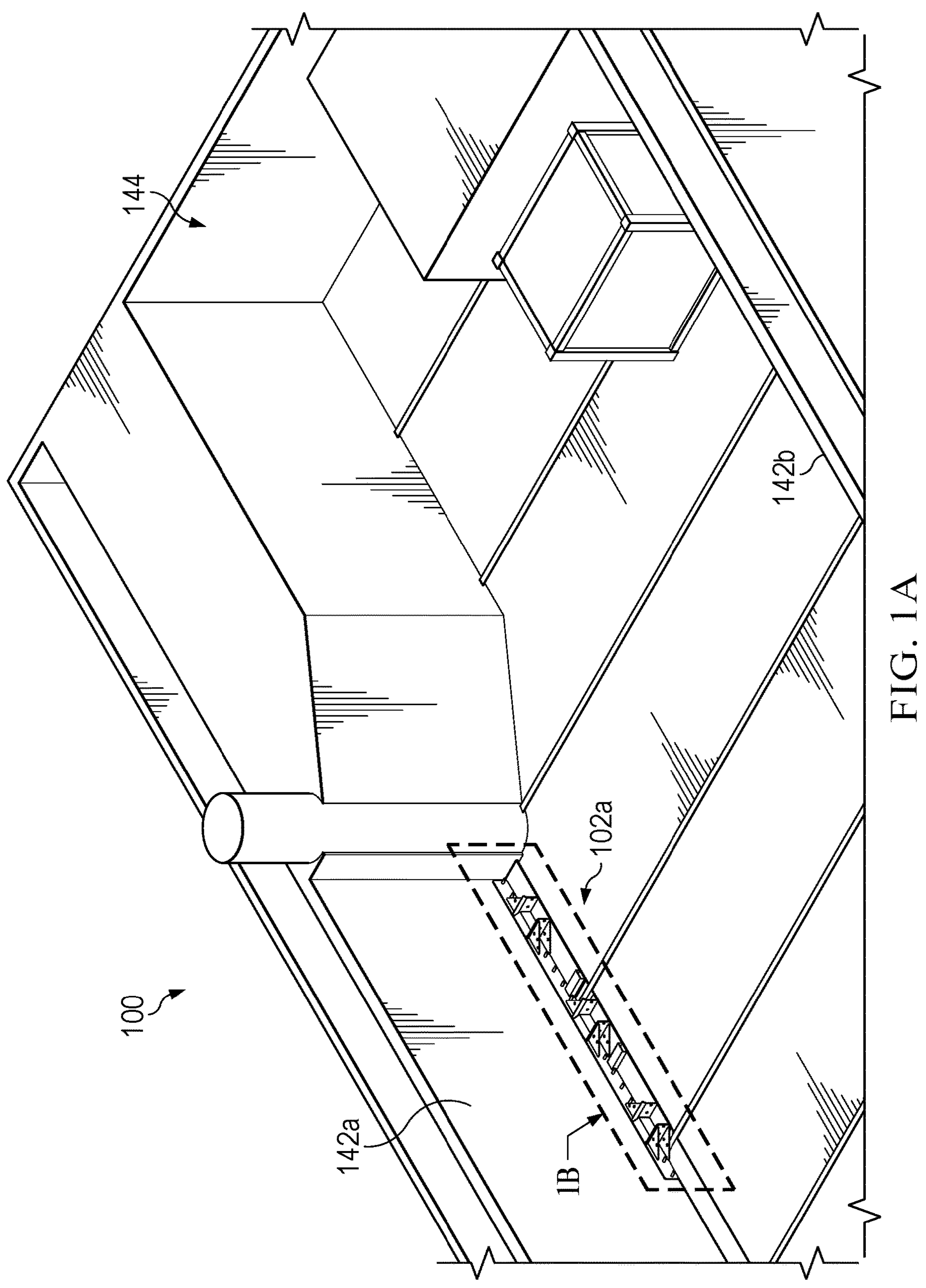
Figure 1B:
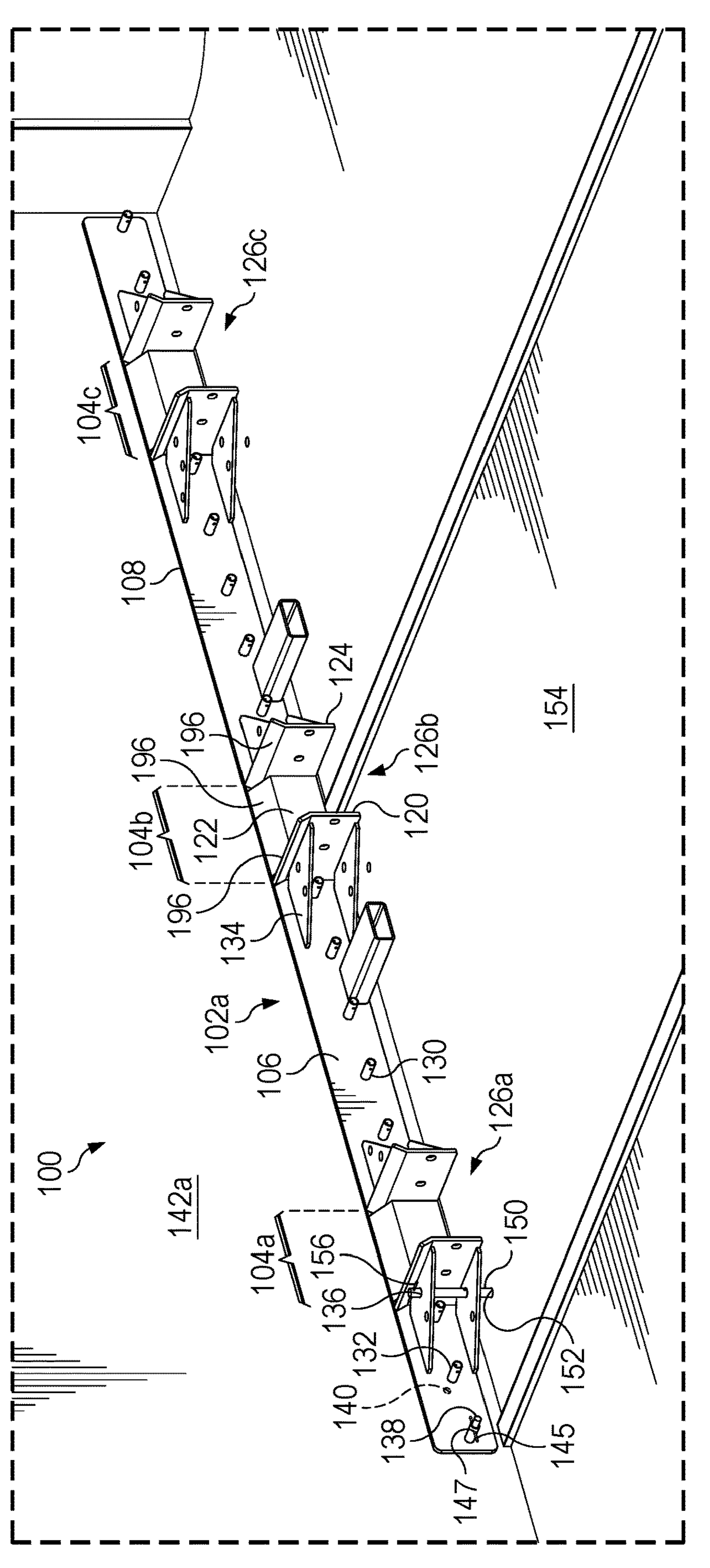
Figure 1C:
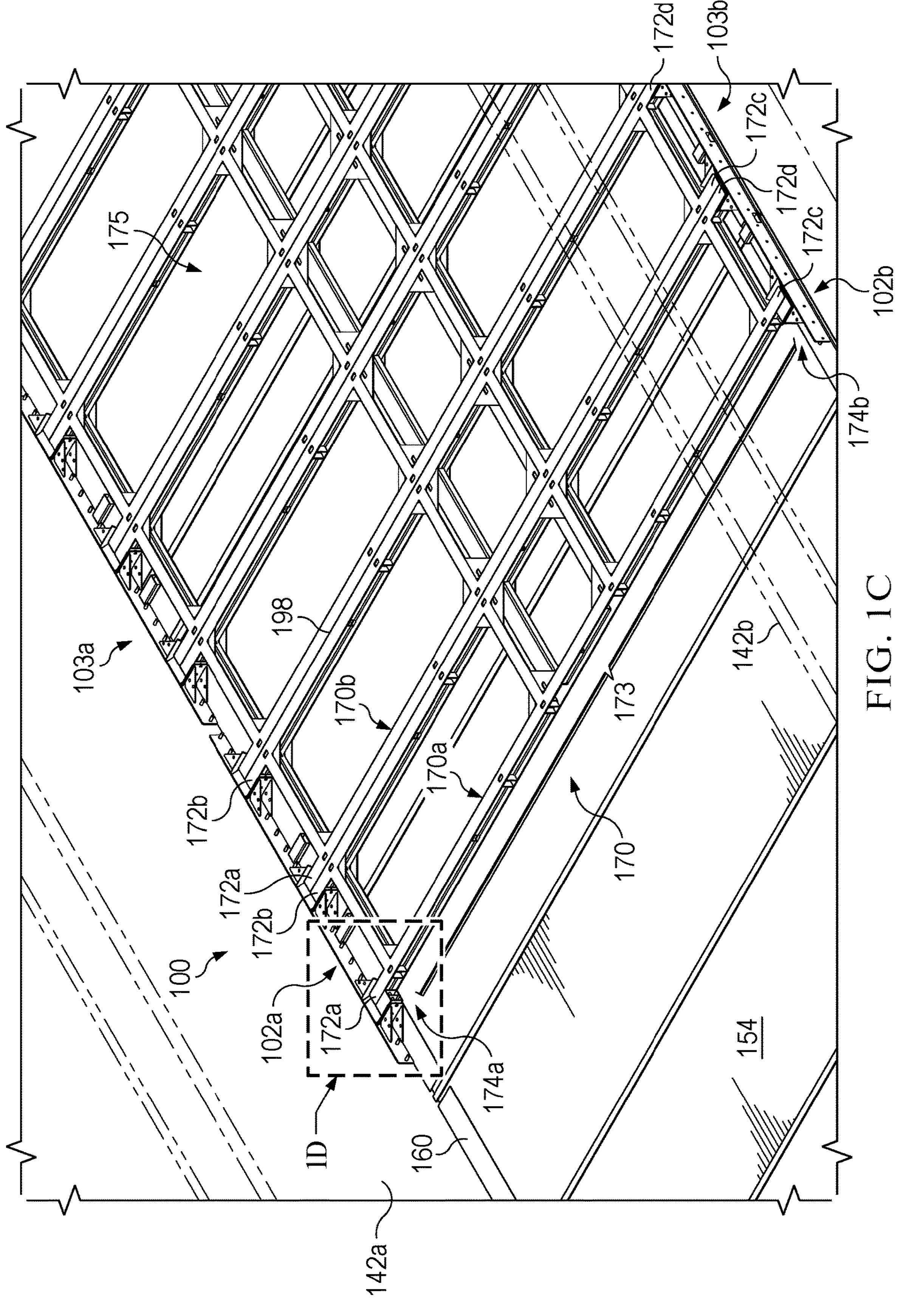
Figure 1D:
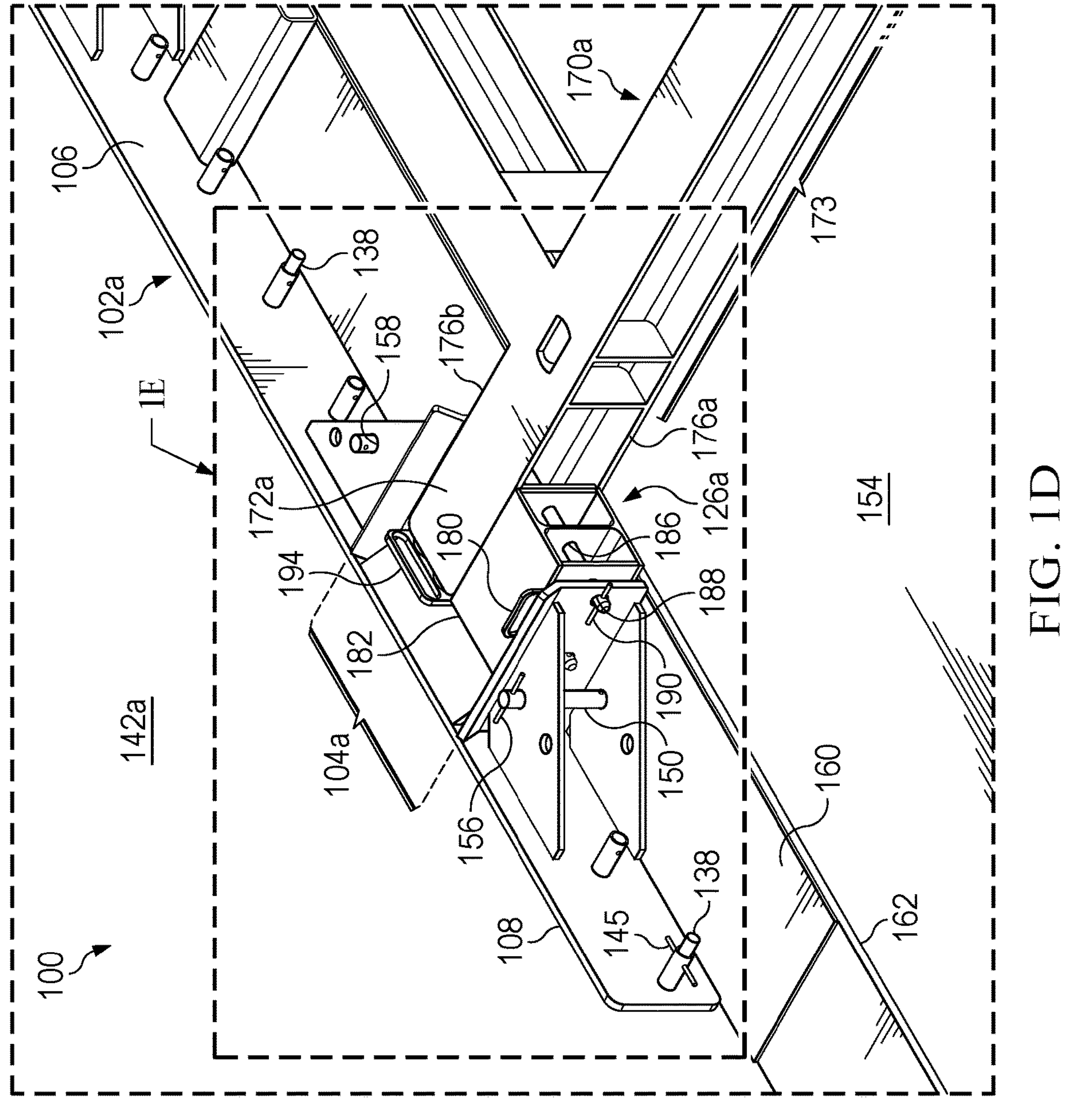
Figure 1E:
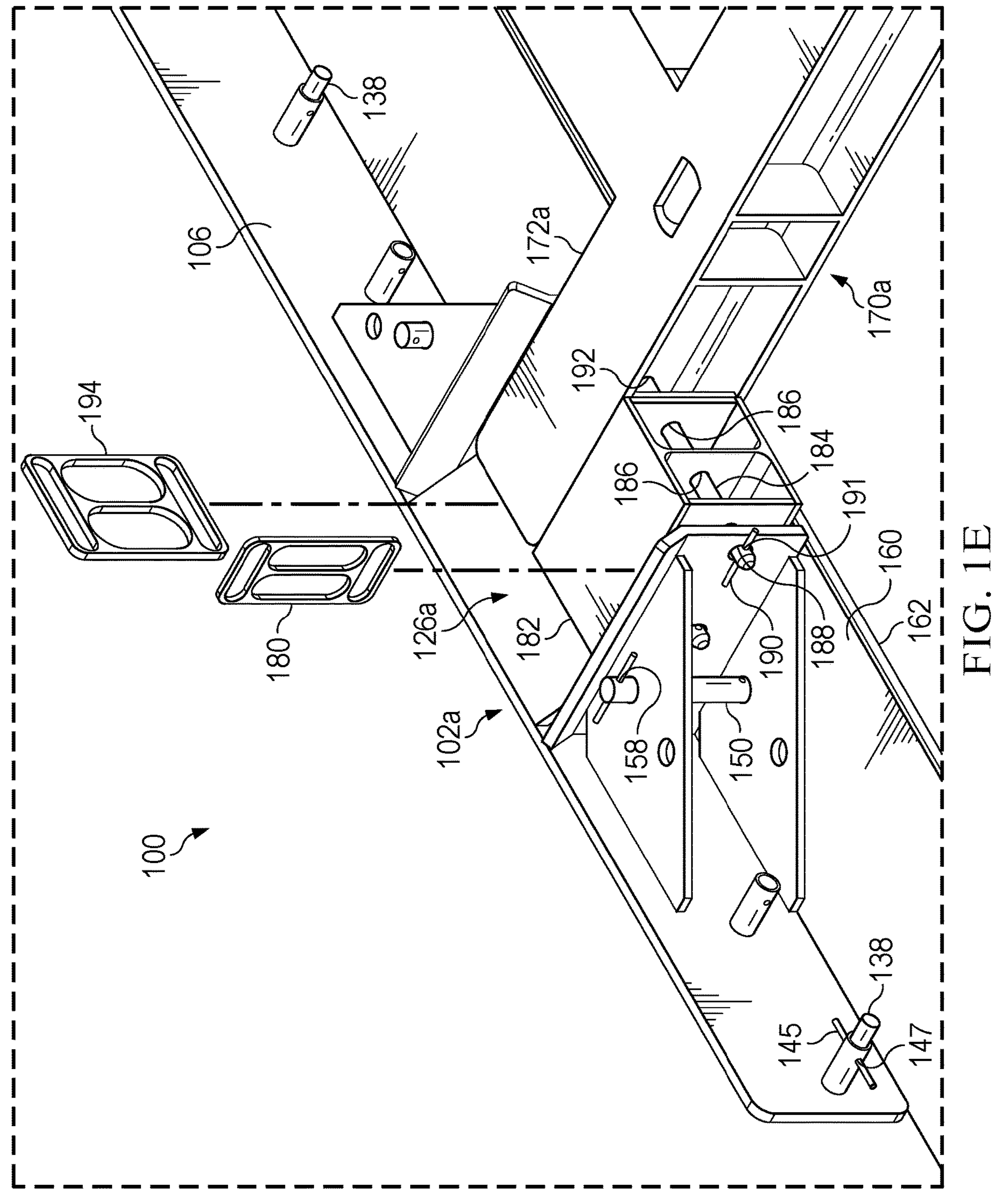
Figure 2:
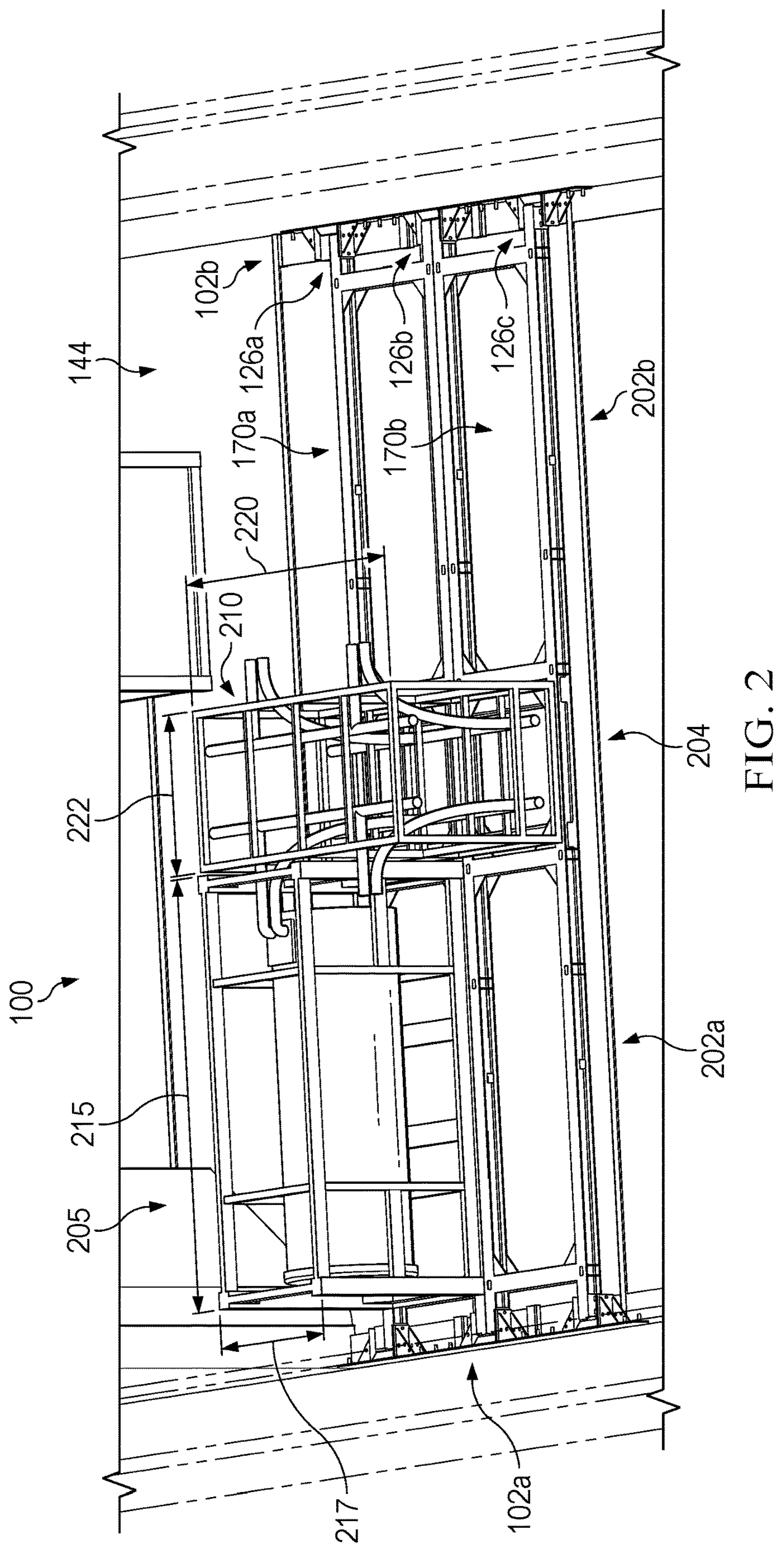
Figure 3:
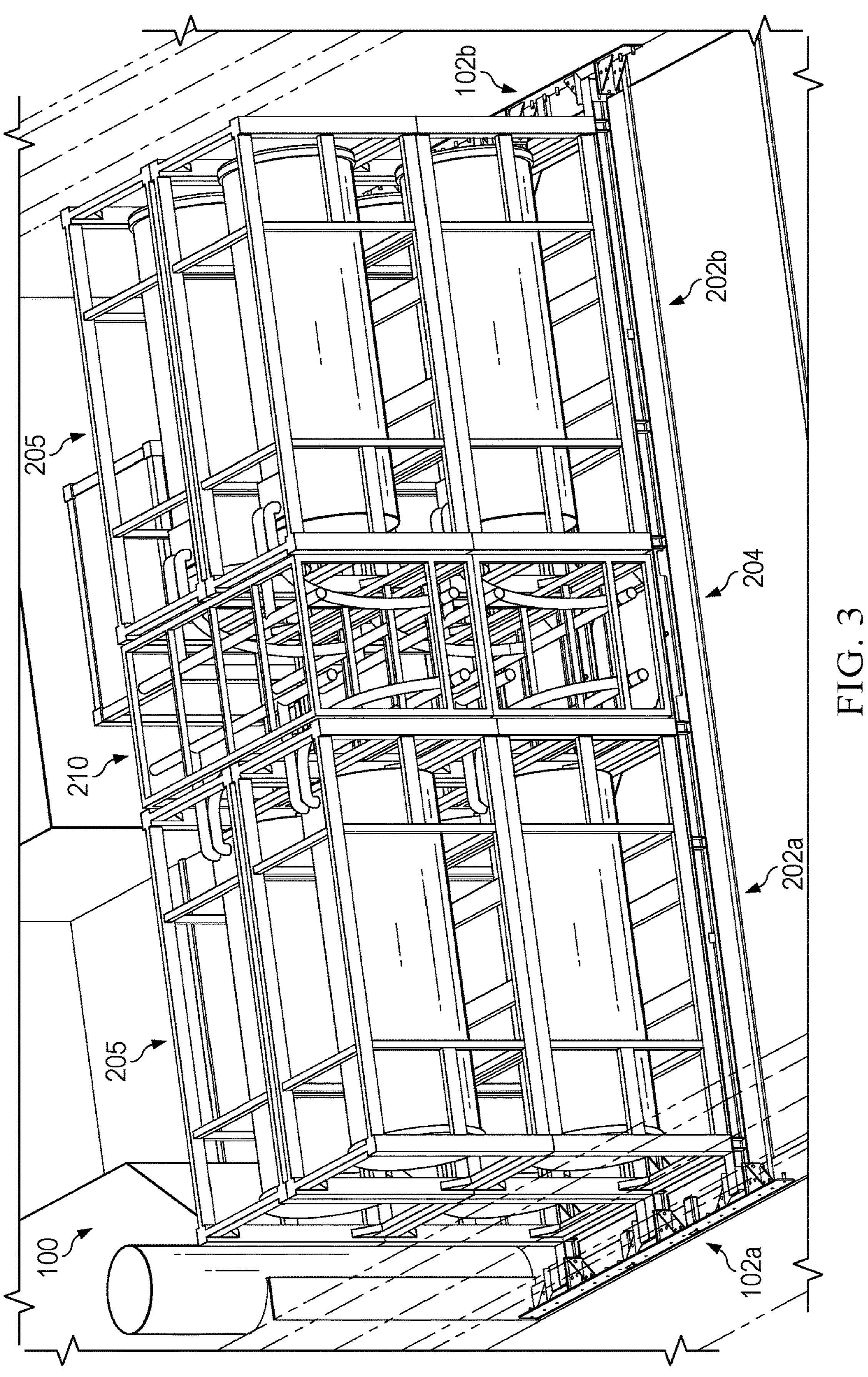
Figure 4:
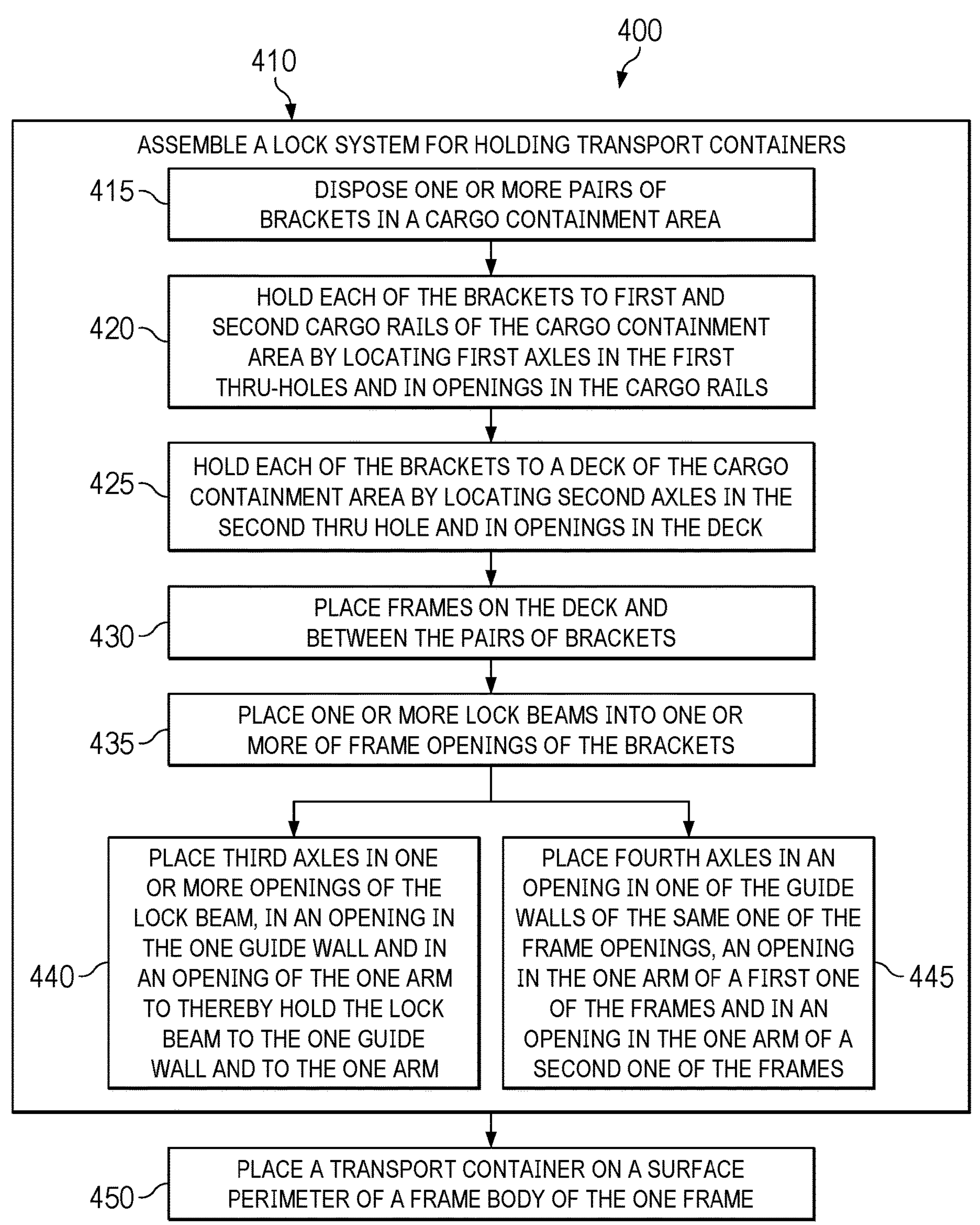

Reference is now made to the following descriptions taken in conjunction with the accompanying drawings, in which:

FIG. 1A presents a perspective view of an embodiment of a bracket of a lock system of the disclosure, the bracket held in a cargo containment area;

FIG. 1B presents a detailed view of the bracket depicted in FIG. 1A;

FIG. 1C presents another perspective view of a plurality of brackets, analogous to the brackets depicted in FIGS. 1A and 1B, and of frames disposed in the cargo containment area and held between the brackets;

FIG. 1D presents a detailed view of a portion of one of the brackets depicted in FIG. 1C;

FIG. 1E presents a further detailed view of the portion of the brackets depicted in FIG. 1D;

FIG. 2 presents a perspective view of brackets and frames analogous to the brackets and frames depicted in FIG. 1C, and with transport containers held on the frames;

FIG. 3 presents another perspective view analogous to that depicted in FIG. 2 and showing vertical stacks of transport containers held on the frames; and FIG. 4 presents a flow diagram of an example method of assembling any embodiments of the lock system such as disclosed in the context of FIGS. 1A-3.

DETAILED DESCRIPTION

Disclosed is a lock system to securely hold transport containers in shipping vessels without relying upon welded or bolted connections. As further disclosed herein, embodiments of our locking system feature brackets which are disposed in a cargo containment area such that frames disposed between pairs of the brackets and the frames held in place in a quick-connect, weld-free and bolt-free interlocking engagement. Because there is no need to form welded or bolted engagements, or to disconnect such welded or bolted engagements, the loading and unloading of transport containers can be accomplished more time efficiently than previous procedure requiring welding or bolting and de-welding and de-bolting.

For instance, the use of a welding or bolting system traditionally require a time-consuming logistical process of making appointments and coordinating multiple different personnel (e.g., welders or metal fitters), and their associated equipment and consumables, need to be arranged to perform the welding or bolting at the containment area of the shipping vessel. Then, reservations for non-Destructive Testing (NDT) inspectors and certifiers need to be made to obtain safety and standards compliance approvals (e.g., Det Norske Veritas, DNV, certifications) of these fastenings. Moreover, this logistical process has to be repeated when the containers are unfastened (e.g., de-welded and/or de-bolted) for unloading from the containment area. Additionally, the appointment of any of these personal can be delayed due to unpredictable weather conditions (e.g., turbulent seas, high winds, rain, etc.) that could endanger personnel, or, could prevent the fastenings from meeting approved standards.

This is in contrast to our disclosed lock system, which by forming weld-free and bolt-free interlocking engagement, helps to mitigate many of these logistical problems, e.g., by avoiding the need for time-consuming fastening and de-fastening procedures and their associated inspection and certification.

As further disclosed herein, embodiments of the brackets and frames can be designed to accommodate and guide the placement of standardized transport containers e.g., international trade compliant containers having specifications as per the standards of the International Standards Organization, known as ISO containers) in an efficient patterned manner. For instance, as further disclosed herein, a surface perimeter and subzones of a frame body of the frames can be sized to hold at least a portion of a container or containers in a standardized predetermined layout pattern and thereby efficiently use a cargo containment area of a shipping vessel and reduce the time and therefore cost needed to fill the cargo containment area.

It may not be not obvious that the lock system disclosed herein would provide substantial time and cost savings. There are substantial up-front cost associated with the design, construction and fabrication of the brackets, frames and other components of the lock system, as well as the preparation of the cargo containment area, e.g., by providing a shipping vessel with cargo rails and deck or metal plate surfaces with openings, to secure the brackets. However, the ability to adapt and easily assemble of our lock system, or disassemble and redeploy the lock system, for use for different types of transport containers and different cargo containment areas provides substantial long-term benefits.

One embodiment of the disclosure is a lock system 100 for holding transport containers such as illustrated in FIGS. 1A-1E. With continuing reference to FIGS. 1A-1F throughout, the system 100 can include one or more pairs of brackets (e.g., FIG. 1C, brackets 102*a*, 102*b*). Each of the brackets includes one or more frame guides (e.g., FIG. 1B, frame guides 104*a*, 104*b*, 104*c*) coupled to a major surface of a bracket body of the bracket (e.g., FIG. 1B, surface 106 of body 108). Each of the frame guides have one or more guide walls (e.g., FIG. 1B, walls 120 122 124). The walls project perpendicularly from the major surface of the bracket body to form frame openings (e.g., FIG. 1B, openings 126*a*, 126*b*, 126*c*). The bracket also includes axle guides coupled to the bracket body and the axle guides project perpendicularly from the major surface of the body (e.g., FIG. 1B, guide 130). Each of the axle guides surround thru-holes in the bracket body (e.g., FIG. 1B, first thru-hole 132). The bracket further includes one or more gusset plates coupling one of the guide walls to the major surface (e.g., FIG. 1B, gusset plate 134 coupled to wall 120 and surface 106). Each of the gusset plates have one or more thru holes therein (e.g., FIG. 1B, second through holes 136).

Embodiments of the lock system 100 can include the pairs of brackets disposed in a cargo containment area, such that the first bracket of the pair of brackets can be positioned against a first cargo rail of the cargo containment area (e.g., FIG. 1A-1B, first bracket 102*a* positioned against first cargo rail 142*a* of cargo containment area 144). The second bracket of the pair of brackets can be positioned against a second cargo rail on an opposite side of the cargo containment area as the first bracket (e.g., FIG. 1C, second bracket 102*b* positioned against second cargo railed 142*b*).

To help secure the brackets to the cargo rail in a predetermined pattern, embodiments of the lock system 100, can further include one or more axles, each of the axles located in one of the thru-holes in the bracket body and in openings of a cargo rail of a cargo containment area that the brackets are disposed in (e.g., FIG. 1B, first axles 138 located in the first thru-holes 132 and in openings 140 of cargo rail 142*a*). Some such embodiments can also include a safety needle fitted through an opening in one of the axle guides and through an opening in the axle to thereby lock the axle into the axle guide (e.g., FIG. 1B, first safety needle 145 fitted through an opening 147 in one of the axle guides 130).

Embodiments of the lock system 100 can further include another axle that is sized to pass into the one or more of thru-holes of the gusset plate of the bracket and into an opening in a deck of the cargo containment area that the bracket is disposed in to thereby hold the bracket to the deck (e.g., FIG. 1B, second axle 150 passable into the second thru-holes 136 of gusset plate 134 and into opening 152 of deck 154). Some such embodiments can also include another safety needle sized to fit through an opening in the other axle thereby lock the second axle to the bracket (e.g., FIGS. 1B, 1E, second safety needle 156 fitted through opening 158 in the second axle 150). For some such embodiments, to help secure the brackets to the deck 154, the deck can include a metal plate 160 (e.g., stainless steel) adhered thereto by an adhesive 162 (e.g., vulcanized rubber coatings, metal particle reinforced rubber coating or similar materials), and a row of the openings 152 in the deck can include aligned openings in the metal plate.

As non-limiting examples, the cargo containment area, and the brackets and frames held therein, can be located in land- or sea-based shipping vessels or part of a mobile drilling fluid plant (e.g., any embodiments of plants such as disclosed in US published application no. 2017/0138134, incorporated by reference herein in its entirety).

As illustrated in FIG. 1C, embodiments of the lock system 100 can further include a frame (e.g., first frame 170*a*) disposed in the cargo containment area 144, the first frame having arms (e.g., arms 172*a*, 172*b*, 172*c*, 172*d* of the first frame 170*a*) extending from a frame body 173, such that the arms of a first end of the first frame (e.g., arms 172*a*, 172*b* at first end 174*a*) fit into the frame openings of the first bracket (e.g., any of frame openings 126*a*, 126*b*, 126*c* of bracket 102*a*) and the arms of an opposite second end (e.g., arms 172*c*, 172*d* at second end 174*b*) of the frame fit into the frame openings of the second bracket (e.g., bracket 102*b*) of the pair of brackets.

Some such embodiments can further including another frame (e.g., second frame 170*b*) disposed in the cargo containment area 144, adjacent to the first frame 170*a* such that one of the arms 172*a* of a first end 174*a* of the second frame fits into a same one of the frame openings (e.g., frame opening 126*b*) of the first bracket 102*a* as one of the arms (e.g., arm 172*b*) of the first frame 170*a* is fitted into, and, another one of the arms 172*b* of the first end of the second frame 170*b* fits into a different one of the frame openings (e.g., opening 126*c*) of the first bracket 102*a*.

In some such embodiments, one of the arms 172*c* of an opposite second end 174*b* of the second frame is fitted into a same one of the frame openings of the second bracket 102*b* as one of the arms (e.g., arm 172*d*) of the first frame is fitted into and another one of the arms 172*d* of the opposite end of the second frame is fit into a different one of the frame openings of the second bracket (e.g., opening 126*c*).

In some embodiments of the system 100, the first and second frames 170*a*, 170*b* can be part of a row of interlocked frames (e.g., FIG. 1C, the first and second frames 170*a*, 170*b* part of a row of frames 175) held together by a row of the first brackets 103*a* and a row of the second brackets 103*b* such that the interlocked frames are held together by bolt-free and weld-free engagements between the brackets and the frames.

As further illustrated in FIG. 1D, in some embodiments of the system 100, one or more of the brackets can further include a side spacer sized to fit between a side of one of the frame arms and one of the guide walls (e.g., side spacer 180 fitted between a side 176*a* of arm 172*s* and guide wall 120).

As illustrated in FIGS. 1D-1E, to facilitate providing a tight interlock, embodiments of the system 100 can include one or more lock beams 182 sized to fit between a side (e.g., side 176*a* or 176*b*) of one of the arms (e.g., arms 172*a* or 172*b*) of the frame (e.g., frame 170*a*), e.g., at a start and end of the row of interlocked frames 175, and one of the guide walls (e.g., wall 120*a*). Some such embodiments can include an axle (e.g., third axle 184) located in one or more openings 186 of the lock beam, in an opening 188 in the one guide wall (e.g., guide wall 120 or 124) and in an opening of the one arm (e.g., opening 192 in arm 172*a*) to thereby hold the lock beam to the one guide wall and to the one arm. Some such embodiments, can further include a safety needle (e.g., third safety needle 190) sized to fit through an opening 191 in the third axle 184 to thereby lock the third axle, the lock beam, the bracket and the one arm together.

In some embodiments, frame arms that are in an interior in the row of frames can include an axle (e.g., a fourth axle analogous to third axle 184) that is located in: an opening in one of the guide walls (e.g., guide wall 120 or 124) of the same one of the frame openings (e.g., frame opening 126*b*), an opening in the one arm (e.g., opening 192 of arm 172*b*) of the first frame 170*a* and in an opening in the one arm of the second frame (e.g., arm 172*b* of frame 170*b*) to thereby hold the arms 172*b*, 172 of the first and second frames to the one guide wall.

As further illustrated in FIGS. 1D-1E, to facilitate providing a tight interlock, embodiments of the system 100 can include one or more end spacers 194 sized to fit between an end of one of the arms (e.g., end 174*a* of arm 172*a*) and one of the guide walls (e.g., wall 122).

In some embodiments of the system 100, to facilitate guiding the frame arms into the bracket openings, upper surfaces one or more of the guide walls can have a bevel that is angled towards the frame opening (e.g., FIG. 1C, upper surfaces 196 of walls 120, 122, 124 beveled towards opening 126*b*).

To facilitate providing a standardized layout pattern for disposing containers on the frames, a surface perimeter 198 of the frame body (e.g., FIG. 1C, surface perimeter 198 of frame body 173) can be sized to correspond to at least a portion of transport containers held thereon, e.g., to correspond to a length or width portion of the containers to be placed on the frame bodies.

For example, as illustrated in FIG. 2, in some embodiments, the surface perimeter 198 can include one or more subzones (e.g., zones 202*a*, 202*b*, 204) to accommodate entire or portions of transport containers (e.g., containers 205, 210) thereon.

As non-limiting examples, in some embodiments the frames 170*a*, 170*b* and their subzones 202*a*, 202*b*, 204 can be sized to hold containers 205, 210 that are cuttings transport tank (CTT) containers and cutting manifold frame (CMF) container, respectively. As familiar to those skilled in the art, CMF is a container frame with pre-mounted fill lines, control panels and act as a safe working place for the operators during installation, operation and de-installation. In other embodiments, however the frames can be sized to hold any ISO containers or even non-standard-sized containers. For example, in some embodiments, the two outer subzones 202*a*, 202*b* of the frame are sized to hold an entire length 215 and full width 217 of the CTT containers 205 and the inner subzone 210 is sized to fit one-half of an entire length 220 and full width 222 of the CMF container 210. E.g., the length 220 of the CMF container 210 can be held by the inner subzones 210 of two adjacent frames 170*a*, 170*b*. As illustrated in FIG. 3, the two adjacent frames can support four CTT containers 205, as a stack of two containers, on each the outer subzones 202*a*, 202*b* and a stack of two CMF containers 210 on the inner subzone 204.

In view of the present disclosure, one skilled in the art would appreciate how different variations of frame surface perimeter 198 dimensions could be adapted to hold different types of containers in stacked or unstacked arrangements, to optimize efficient container storage for any given cargo containment area.

Another embodiment of the disclosure is a method. With continuing reference to the flow diagram shown in FIG. 4, the method 400 includes assembling (step 410) a lock system, such as assembling any of the embodiments of the lock system 100 disclosed in the context of FIGS. 1A-3.

Assembling the lock system (step 410) includes disposing (step 415) one or more pairs of brackets 102*a*, 102*b* in a cargo containment area 144. Each of the brackets includes one or more frame guides 104*a*, 104*b*, 104*c*, axle guides 130 and one or more gusset plates 134. The frame guides are coupled to a major surface 106 of a bracket body 108 of the bracket 102, and each of the frame guides have one or more guide walls 120, 122, 124, projecting perpendicularly from the major surface 106 to form frame openings 126*a*, 126*b*, 126*c*. The axle guides are coupled to, and projecting perpendicularly from, the major surface 106, and each of the axle guides surround first thru-holes 132 in the bracket body. The gusset plates 134 couple one of the guide walls to the major surface 106 and each of the gusset plates have one or more second thru holes 136.

Assembling the lock system (step 410) also includes holding (step 420) each of the brackets 102*a*, 102*b* to first and second cargo rails 142*a*, 142*b* of the cargo containment area by locating first axles in the first thru-holes and in openings 140 in the cargo rails.

Assembling the lock system (step 410) further includes holding (step 425) each of the brackets to a deck 154 of the cargo containment area by locating second axles 150 in the second thru holes 136 and in openings 152 in the deck.

In some embodiments, assembling the lock system (step 410) includes placing (step 430) frames 170 on the deck and between the pairs of brackets 102*a*, 102*b*. Each of the frames has arms (e.g., 172*a*, 172*b*) extending from a frame body and each of the arms are sized to fit into the frame openings of a first one of the pairs of brackets 102*a* and to fit into the frame openings 126*a*, 126*b*. 126*c* of a second one of the pairs of brackets 102*b*. The first and second brackets are held to the first and second cargo rails, respectively, and the cargo rails are located on opposing sides of the cargo containment area.

In some embodiments, assembling the lock system (step 410) includes placing (step 435) one or more lock beams into one or more of the frame openings of the brackets, the lock beams sized to fit between a side 176*a*, 176*b* of one of the arms 172*a*, 172*b* of the frames 170*a*, 170*b* (e.g., placed in step 430) and one of the guide walls 120 124. In some such embodiments, the lock beam can be placed in step 435 after the frames are placed in step 430, while in other embodiments the lock beam can be placed in step 435 and then the frames can be placed in step 430. In some such embodiments, assembling the lock system (step 410) includes placing third axles 184 in one or more openings 186 of the lock beam (placed in step 440), in an opening 188 in the one guide wall (e.g., walls 120 124) and in an opening of the one arm (e.g., opening 192 of arm 172*a*) to thereby hold the lock beam to the one guide wall and to the one arm.

In some such embodiments, assembling the lock system (step 410) includes placing fourth axles (analogous to axle 184) in: an opening in one of the guide walls of the same one of the frame openings, an opening in the one arm of the first frame (e.g., opening 192 of arm 172*b* of frame 170*a*) and in an opening in the one arm of the second frame (e.g., opening 192 of arm 172*a* of frame 170*b*) to thereby hold the arms of the first and second frames to the one guide wall.

Embodiments of the method 100 can further include placing (step 450) one or more transport containers 205, 210 on a surface perimeter 198 of the frame body 172 of the frames 170*a*, 170*b*. As a non-limiting example, after placing adjacent pairs of frames 170*a*, 170*b* (e.g., placed in step 430) between the opposing brackets 102*a*, 102*b* (e.g., disposed in step 415), one type of transport container 210 can be placed as part of step 450 on inner subzones 204 of the surface perimeters 198 of the adjacent frames and another type of transport container 205 can be placed as part of step 450 on outer subzones 202*a*, 202*b* of the adjacent frames.

Each of the foregoing embodiments may include one or more of the following elements singly or in combination, and neither the example embodiments or the following listed elements limit the disclosure, but are provided as examples of the various embodiments covered by the disclosure:

Element 1: A lock system for holding transport containers, the system comprising: one or more pairs of brackets, each of the brackets including: one or more frame guides coupled to a major surface of a bracket body of the bracket, wherein each of the frame guides have one or more guide walls projecting perpendicularly from the major surface to form frame openings, axle guides coupled to and projecting perpendicularly from the major surface, each of the axle guides surrounding first thru-holes in the bracket body, and one or more gusset plates coupling one of the guide walls to the major surface, each of the gusset plates having one or more second thru holes therein.

Element 2: the system wherein the pairs of brackets are disposed in a cargo containment area such that the first bracket of the pair of brackets is positioned against a first cargo rail of the cargo containment area and the second bracket of the pair of brackets is positioned against a second cargo rail on an opposite side of the cargo containment area as the first bracket.

Element 3: the system further including one or more first axles each located in one of the first thru-holes and in openings of a cargo rail of a cargo containment area that the brackets are disposed in.

Element 4: the system further including a second axle sized to pass into the one or more second thru-holes of the gusset plate and into an opening in a deck of the cargo containment area that the bracket is disposed in to thereby hold the bracket to the deck.

Element 5: the system wherein the deck includes a metal plate adhered thereto by an adhesive, and the opening in the deck includes an opening in the metal plate.

Element 6: the system wherein the cargo containment area is located in a land-based or sea-based shipping vessel or part of a mobile drilling fluid plant.

Element 7: the system further including a first frame disposed in the cargo containment area, the first frame having arms extending from a frame body, such that the arms of a first end of the first frame fit into the frame openings of the first bracket and the arms of an opposite second end of the first frame fit into the frame openings of the second bracket.

Element 8: the system further including a second frame disposed in the cargo containment area, adjacent to the first frame such that one of the arms of a first end of the second frame fits into a same one of the frame openings of the first bracket as one of the arms of the first frame is fitted into, and, another one of the arms of the first end of the second frame fits into a different one of the frame openings of the first bracket.

Element 9: the system wherein one of the arms of an opposite second end of the second frame is fitted into a same one of the frame openings of the second bracket as one of the arms of the first frame and another one of the arms of the opposite end of the second frame is fit into a different one of the frame openings of the second bracket.

Element 10: the system wherein the first and second frames are part of a row of interlocked frames held together by a row of the first brackets and a row of the second brackets such that the interlocked frames are held together by bolt-free and weld-free engagements between the brackets and the frames.

Element 11: the system wherein the brackets further include a side spacer sized to fit between a side of one of the arms and one of the guide walls.

Element 12: the system further including one or more lock beams sized to fit between a side of one of the arms of the frame at a start and end of the row of interlocked frames, and one of the guide walls.

Element 13a: the system further including a third axel located in one or more openings of the lock beam, in an opening in the one guide wall and in an opening of the one arm to thereby hold the lock beam to the one guide wall and to the one arm.

Element 13b: the system further including a fourth axle, the fourth axle located in: an opening in one of the guide walls of the same one of the frame openings, an opening in the one arm of the first frame and in an opening in the one arm of the second frame to thereby hold the arms of the first and second frames to the one guide wall.

Element 14: the system further including one or more end spacers sized to fit between an end of one of the arms and one of the guide walls.

Element 15: the system wherein upper surfaces of one or more of the guide walls has a bevel that is angled towards the frame opening to thereby guide the one arm into the frame opening.

Element 16: a method comprising assembling a lock system for holding transport containers, including: disposing one or more pairs of brackets in a cargo containment area, each of the brackets including: one or more frame guides coupled to a major surface of a bracket body of the bracket, wherein each of the frame guides have one or more guide walls projecting perpendicularly from the major surface to form frame openings, axle guides coupled to and projecting perpendicularly from the major surface, each of the axle guides surrounding first thru-holes in the bracket body, and one or more gusset plates coupling one of the guide walls and to the major surface, each of the gusset plates having one or more second thru holes therein; holding each of the brackets to first and second cargo rails of the cargo containment area by locating first axles in the first thru-holes and in openings in the cargo rails; and holding each of the brackets to a deck of the cargo containment area by locating second axles in the second thru hole and in openings in the deck.

Element 17: the method, wherein the assembling further including placing frames on the deck and between the pairs of brackets each of the frames having arms extending from a frame body, each of the arms sized to fit into the frame openings of a first one of the pairs of brackets and to fit into the frame openings of a second one of the pairs of brackets, wherein the first and second brackets are held to the first and second cargo rails, respectively, the cargo rails located on opposing sides of the cargo containment area.

Element 18: the method wherein the assembling further including placing one or more lock beams into one or more of the frame openings of the brackets, the lock beams sized to fit between a side of one of the arms and one of the guide walls.

Element 19a: the method wherein the assembling further including placing third axles in one or more openings of the lock beam, in an opening in the one guide wall and in an opening of the one arm to thereby hold the lock beam to the one guide wall and to the one arm.

Element 19b: the method wherein the assembling further includes placing fourth axles in: an opening in one of the guide walls of the same one of the frame openings, an opening in the one arm of the first frame and in an opening in the one arm of the second frame to thereby hold the arms of the first and second frames to the one guide wall.

Element 20: the method further including placing one or more transport containers on a surface perimeter of the frame body of the frames.

The foregoing listed embodiments and elements do not limit the disclosure to just those listed above, and those skilled in the art to which this application relates will appreciate that other and further additions, deletions, substitutions and modifications may be made to the described embodiments.

What is claimed is:

1. A lock system for holding transport containers, the system comprising:

one or more pairs of brackets, each of the brackets including:

one or more frame guides coupled to a major surface of a bracket body of the bracket, wherein each of the frame guides have one or more guide walls projecting perpendicularly from the major surface to form frame openings, axle guides coupled to and projecting perpendicularly from the major surface, each of the axle guides surrounding first thru-holes in the bracket body, and one or more gusset plates coupling one of the guide walls to the major surface, each of the gusset plates having one or more second thru holes therein.

2. The system of claim 1, wherein the pairs of brackets are disposed in a cargo containment area such that the first bracket of the pair of brackets is positioned against a first cargo rail of the cargo containment area and the second bracket of the pair of brackets is positioned against a second cargo rail on an opposite side of the cargo containment area as the first bracket.

3. The system of claim 2, further including a second axle sized to pass into the one or more second thru-holes of the gusset plate and into an opening in a deck of the cargo containment area that the bracket is disposed in to thereby hold the bracket to the deck.

4. The system of claim 3, wherein the deck includes a metal plate adhered thereto by an adhesive, and the opening in the deck includes an opening in the metal plate.

5. The system of claim 2, wherein the cargo containment area is located in a land-based or sea-based shipping vessel or part of a mobile drilling fluid plant.

6. The system of claim 1, further including one or more first axles each located in one of the first thru-holes and in openings of a cargo rail of a cargo containment area that the brackets are disposed in.

7. The system of claim 2, further including a first frame disposed in the cargo containment area, the first frame having arms extending from a frame body, such that the arms of a first end of the first frame fit into the frame openings of the first bracket and the arms of an opposite second end of the first frame fit into the frame openings of the second bracket.

8. The system of claim 7, further including a second frame disposed in the cargo containment area, adjacent to the first frame such that one of the arms of a first end of the second frame fits into a same one of the frame openings as one of the arms of the first frame is fitted into, and, another one of the arms of the first end of the second frame fits into a different one of the frame openings of the first bracket.

9. The system of claim 8, wherein one of the arms of an opposite second end of the second frame is fitted into a same one of the frame openings of the second bracket as one of the arms of the first frame and another one of the arms of the opposite end of the second frame is fit into a different one of the frame openings of the second bracket.

10. The system of claim 8, wherein the first and second frames are part of a row of interlocked frames held together by a row of the first brackets and a row of the second brackets such that the interlocked frames are held together by bolt-free and weld-free engagements between the brackets and the frames.

11. The system of claim 8, further including one or more lock beams sized to fit between a side of one of the arms of the frame at a start and end of the row of interlocked frames, and one of the guide walls.

12. The system of claim 11, further including a third axle located in one or more openings of the lock beam, in an opening in the one guide wall and in an opening of the one arm to thereby hold the lock beam to the one guide wall and to the one arm.

13. The system of claim 8, wherein upper surfaces of one or more of the guide walls has a bevel that is angled towards the frame opening to thereby guide the one arm into the frame opening.

14. The system of claim 7, wherein the brackets further include a side spacer sized to fit between a side of one of the arms and one of the guide walls.

15. The system of claim 7, further including one or more end spacers sized to fit between an end of one of the arms and one of the guide walls.

16. A method, comprising:

assembling a lock system for holding transport containers, including:

disposing one or more pairs of brackets in a cargo containment area, each of the brackets including:

one or more frame guides coupled to a major surface of a bracket body of the bracket, wherein each of the frame guides have one or more guide walls projecting perpendicularly from the major surface to form frame openings, axle guides coupled to and projecting perpendicularly from the major surface, each of the axle guides surrounding first thru-holes in the bracket body, and one or more gusset plates coupling one of the guide walls and to the major surface, each of the gusset plates having one or more second thru holes therein;

holding each of the brackets to first and second cargo rails of the cargo containment area by locating first axles in the first thru-holes and in openings in the cargo rails; and holding each of the brackets to a deck of the cargo containment area by locating second axles in the second thru hole and in openings in the deck.

17. The method of claim 16, wherein the assembling further including placing frames on the deck and between the pairs of brackets each of the frames having arms extending from a frame body, each of the arms sized to fit into the frame openings of a first one of the pairs of brackets and to fit into the frame openings of a second one of the pairs of brackets, wherein the first and second brackets are held to the first and second cargo rails, respectively, the cargo rails located on opposing sides of the cargo containment area.

18. The method of claim 17, wherein the assembling further including placing one or more lock beams into one or more of the frame openings of the brackets, the lock beams sized to fit between a side of one of the arms and one of the guide walls.

19. The method of claim 17, wherein the assembling further including placing third axles in one or more openings of the lock beam, in an opening in the one guide wall and in an opening of the one arm to thereby hold the lock beam to the one guide wall and to the one arm.

20. The method of claim 17, further including placing one or more transport containers on a surface perimeter of the frame body of the frames.

* * * * *